United States Patent
Horie et al.

(10) Patent No.: US 6,935,172 B2
(45) Date of Patent: Aug. 30, 2005

(54) THERMAL TYPE FLOW MEASURING DEVICE

(75) Inventors: Junichi Horie, Chiyoda-ku (JP); Izumi Watanabe, Ibaraki (JP); Shinya Igarashi, Ibaraki (JP); Keiichi Nakada, Chiyoda-ku (JP); Kei Ueyama, Chiyoda-ku (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/486,563
(22) PCT Filed: Aug. 14, 2001
(86) PCT No.: PCT/JP01/07018
§ 371 (c)(1), (2), (4) Date: Feb. 11, 2004
(87) PCT Pub. No.: WO03/016833
PCT Pub. Date: Feb. 27, 2003

(65) Prior Publication Data
US 2004/0211253 A1 Oct. 28, 2004

(51) Int. Cl.$^7$ ................................................. G01F 1/68
(52) U.S. Cl. ................................................. 73/204.15
(58) Field of Search .................... 73/204.26, 204.22, 73/204.14, 204.27, 204.15

(56) References Cited

U.S. PATENT DOCUMENTS

| | | | |
|---|---|---|---|
| 5,369,994 A | | 12/1994 | Hecht et al. ............. 73/204.16 |
| 5,703,288 A | * | 12/1997 | Horiguchi et al. ........ 73/204.26 |
| 5,717,136 A | * | 2/1998 | Aoi et al. ................ 73/204.26 |
| 6,494,090 B1 | * | 12/2002 | Losing et al. ............ 73/204.26 |

FOREIGN PATENT DOCUMENTS

| | | |
|---|---|---|
| JP | 60-142268 | 7/1985 |
| JP | 2-120621 | 5/1990 |
| JP | 6-160142 | 6/1994 |
| JP | 2000-193505 | 7/2000 |

* cited by examiner

Primary Examiner—Edward Lefkowitz
Assistant Examiner—Jewel V. Thompson
(74) Attorney, Agent, or Firm—Crowell & Moring LLP

(57) ABSTRACT

A thermal type flow measuring device comprises a heating resistor(HF), a temperature measuring resistor(Ru) upstream of the heating resistor(HF) with respect to a fluid(Q), and a temperature measuring resistor(Rd) downstream of the heating resistor(HF). A heat sensitive resistance element(CF), the upstream temperature measuring resistor(Ru) and the downstream temperature measuring resistor(Rd) form a first bridge circuit, and this first bridge circuit and the heating resistor(HF) form a second bridge circuit. Feedback control means(OP1, Tr) heat the heating resistor(HF) in accordance with an output for keeping a balance of the second bridge circuit. The distance between the heat sensitive resistance element(CF) and the heating resistor(HF) is larger than the distance between the upstream temperature measuring resistor(Ru) or the downstream temperature sensitive resistor(Rd) and the heating resistor(HF) so that the heat sensitive resistance element(CF) is positioned to receive less thermal influences from the heating resistor(HF) than the upstream temperature measuring resistor(Ru) and the downstream temperature sensitive resistor(Rd). The upstream temperature measuring resistor or the downstream temperature measuring resistor is heated by the heating resistor, and the flow rate of the fluid is measured based on an output for keeping a balance of the first bridge circuit.

18 Claims, 13 Drawing Sheets

THERMAL TYPE FLOW MEASURING DEVICE

TECHNICAL FIELD

The present invention relates to a thermal type flow measuring device, and more particularly to a thermal type flow measuring device suitable for use in, e.g., control of an automobile engine to measure the flow rate of engine intake air.

BACKGROUND ART

One known thermal type flow measuring device is disclosed in, e.g., JP,A 60-142268. In this disclosed thermal type flow measuring device, a heater is formed in a bridge section formed by etching a silicon wafer, and temperature sensors are formed respectively upstream and downstream of the heater.

Further, a reference-purpose air temperature sensor is formed in a frame area other than the bridge section, and the heater temperature is feedback controlled to be held at a constant value higher than the air temperature on the basis of the reference-purpose air temperature sensor. Then, the flow rate of air is detected based on a temperature difference between the temperature sensors disposed upstream and downstream of the heater.

With the technique disclosed in the above-cited JP,A 60-142268, however, because a slit for thermal insulation is formed in the bridge section and the strength of the bridge section is relatively poor, there is a possibility that the bridge section may be easily damaged if dust in air strikes against the bridge section. Also, the technique disclosed in the above-cited publication is not suitable for use in control of an automobile engine, which requires high reliability under severe environments, for the reason that a variation in characteristics may occur upon dust or the like clogging up the slit formed for thermal insulation.

Another problem has been experienced in that because a resistor is heated to serve as the heater, the resistance value and the resistance temperature coefficient of the heater change with time and characteristics of flow rate also vary with time.

On the other hand, a thermal type flow measuring device disclosed in JP,A 2-120621 represents an example in which a variation of sensor characteristics resulting from time-dependent changes of the heater resistance is compensated by adding an electric circuit.

More specifically, the technique disclosed in the above-cited JP,A 2-120621 employs a circuit arrangement for computing a rise of the heater temperature from outputs of sensors upstream and downstream of a heater, computing a difference between the temperature detected by the upstream sensor and the temperature detected by the downstream sensor, and then producing an output resulting from dividing the temperature difference by the temperature rise.

With such a circuit arrangement, the time-dependent changes of the heater resistance can be compensated by using the upstream and downstream temperature sensors.

Additionally, other known techniques related to the thermal type flow measuring device are disclosed in, e.g., U.S. Pat. No. 5,369,994, JP,A 6-160142 and JP,A 2000-193505.

DISCLOSURE OF INVENTION

The technique disclosed in the above-cited JP,A 2-120621, however, requires addition of a compensation circuit as described above, and hence it has accompanied with a problem that the cost of the thermal type flow measuring device is increased.

An object of the present invention is to provide a thermal type flow measuring device, which can reduce flow rate errors caused by time-dependent changes, contamination and damage of a heating resistor, and can perform flow measurement with high accuracy, while ensuring a lower cost.

To achieve the above object, the present invention is constructed as follows.

(1) A thermal type flow measuring device comprising a heating resistor disposed in a fluid, upstream temperature measuring resistors disposed upstream of the heating resistor with respect to the fluid, and downstream temperature measuring resistors disposed downstream of the heating resistor with respect to the fluid, thereby measuring the flow rate of the fluid, wherein the thermal type flow measuring device further comprises a first bridge circuit including the upstream temperature measuring resistors and the downstream temperature measuring resistors, a second bridge circuit including the first bridge circuit and the heating resistor, and feedback control means for heating the heating resistor in accordance with an output for keeping a balance of the second bridge circuit, and wherein the upstream temperature measuring resistors or the downstream temperature measuring resistors are heated by the heating resistor, and the flow rate of the fluid is measured based on an output for keeping a balance of the first bridge circuit.

With that construction, time-dependent changes of flow rate characteristics can be reduced.

(2) A thermal type flow measuring device comprising a heating resistor disposed in a fluid, an upstream temperature measuring resistor disposed upstream of the heating resistor with respect to the fluid, and a downstream temperature measuring resistor disposed downstream of the heating resistor with respect to the fluid, thereby measuring the flow rate of the fluid, wherein the thermal type flow measuring device further comprises a first bridge circuit including a heat sensitive resistance element, the upstream temperature measuring resistor and the downstream temperature measuring resistor, a second bridge circuit including the first bridge circuit and the heating resistor, and feedback control means for heating the heating resistor in accordance with an output for keeping a balance of the second bridge circuit, and wherein the distance between the heat sensitive resistance element and the heating resistor is larger than the distance between the upstream temperature measuring resistor or the downstream temperature sensitive resistor and the heating resistor so that the heat sensitive resistance element is positioned to receive less thermal influences from the heating resistor than the upstream temperature measuring resistor and the downstream temperature sensitive resistor, and the upstream temperature measuring resistor or the downstream temperature measuring resistor is heated by the heating resistor, and the flow rate of the fluid is measured based on an output for keeping a balance of the first bridge circuit.

With that construction, time-dependent changes of flow rate characteristics can be reduced.

(3) A thermal type flow measuring device comprising a heating resistor disposed in a fluid, upstream temperature measuring resistors disposed upstream of the heating resistor with respect to the fluid, and downstream temperature measuring resistors disposed downstream of the heating resistor with respect to the fluid, thereby measuring the flow rate of the fluid, wherein the thermal type flow measuring device further comprises a first bridge circuit including the upstream temperature measuring resistors and the downstream temperature measuring resistors, a second bridge circuit including a heat sensitive resistance element and the heating resistor, and feedback control means for heating the heating resistor in accordance with an output for keeping a balance of the second bridge circuit, and wherein the heat sensitive resistance element is heated by the heating resistor, and the flow rate of the fluid is measured based on an output for keeping a balance of the first bridge circuit.

With that construction, time-dependent changes of flow rate characteristics can be reduced.

(4) A thermal type flow measuring device comprising a heating resistor disposed in a fluid, upstream temperature measuring resistors disposed upstream of the heating resistor with respect to the fluid, and downstream temperature measuring resistors disposed downstream of the heating resistor with respect to the fluid, thereby measuring the flow rate of the fluid, wherein the thermal type flow measuring device further comprises a first bridge circuit including the upstream temperature measuring resistors and the downstream temperature measuring resistors, a second bridge circuit including a heat sensitive resistance element and the heating resistor, feedback control means for heating the heating resistor in accordance with an output for keeping a balance of the second bridge circuit, a heating resistor for heating the heat sensitive resistance element, and heating control means for heating the heating resistor in accordance with an output of the feedback control means, and wherein the flow rate of the fluid is measured based on an output for keeping a balance of the first bridge circuit.

With that construction, time-dependent changes of flow rate characteristics can be reduced.

(5) In above (1) to (4), preferably, the flow direction of the fluid is detected based on the output of the first bridge circuit.

With that construction, it is possible to reduce time-dependent changes of flow rate characteristics, to suppress a characteristics variation caused by contamination or damage, and to cut down output noise.

(6) In above (1) to (4), preferably, the flow direction of the fluid is detected based on the output of the second bridge circuit.

With that construction, time-dependent changes of flow rate characteristics can be reduced.

(7) In above (1) to (4), preferably, the flow direction of the fluid is detected based on the outputs of the first bridge circuit and the second bridge circuit.

With that construction, time-dependent changes of flow rate characteristics can be reduced.

(8) A control device for an internal combustion engine, which includes flow measuring means for measuring the flow rate of gas supplied to the internal combustion engine, wherein the flow measuring means comprises a heating resistor disposed in a fluid, upstream temperature measuring resistors disposed upstream of the heating resistor with respect to the fluid, downstream temperature measuring resistors disposed downstream of the heating resistor with respect to the fluid, a first bridge circuit including the upstream temperature measuring resistors and the downstream temperature measuring resistors, a second bridge circuit including the first bridge circuit and the heating resistor, and feedback control means for heating the heating resistor in accordance with an output for keeping a balance of the second bridge circuit, and wherein the upstream temperature measuring resistors or the downstream temperature measuring resistors are heated by the heating resistor, and the flow rate of the fluid is measured based on an output for keeping a balance of the first bridge circuit.

With that construction, good fuel economy and clean exhaust gas can be realized, and battery consumption can be reduced.

(9) A control device for a fuel cell, which includes flow measuring means for measuring the flow rate of gas used in the fuel cell, wherein the flow measuring means comprises a heating resistor disposed in a fluid, upstream temperature measuring resistors disposed upstream of the heating resistor with respect to the fluid, downstream temperature measuring resistors disposed downstream of the heating resistor with respect to the fluid, a first bridge circuit including the upstream temperature measuring resistors and the downstream temperature measuring resistors, a second bridge circuit including the first bridge circuit and the heating resistor, and feedback control means for heating the heating resistor in accordance with an output for keeping a balance of the second bridge circuit, and wherein the upstream temperature measuring resistors or the downstream temperature measuring resistors are heated by the heating resistor, and the flow rate of the fluid is measured based on an output for keeping a balance of the first bridge circuit.

With that construction, power generation efficiency is obtained without causing a variation and battery consumption can be reduced.

BEST MODE FOR CARRYING OUT THE INVENTION

The construction of a thermal type flow measuring device according to a first embodiment of the present invention will be described below with reference to FIGS. 1 to 4.

First, the electric circuit arrangement of the thermal type flow measuring device according to the first embodiment of the present invention will be described with reference to FIG. 1. An electric circuit according to the first embodiment comprises temperature control circuitry for a heating resistor HF and flow rate detecting circuitry.

A description is first made of the temperature control circuitry for the heating resistor HF.

Figure 1:
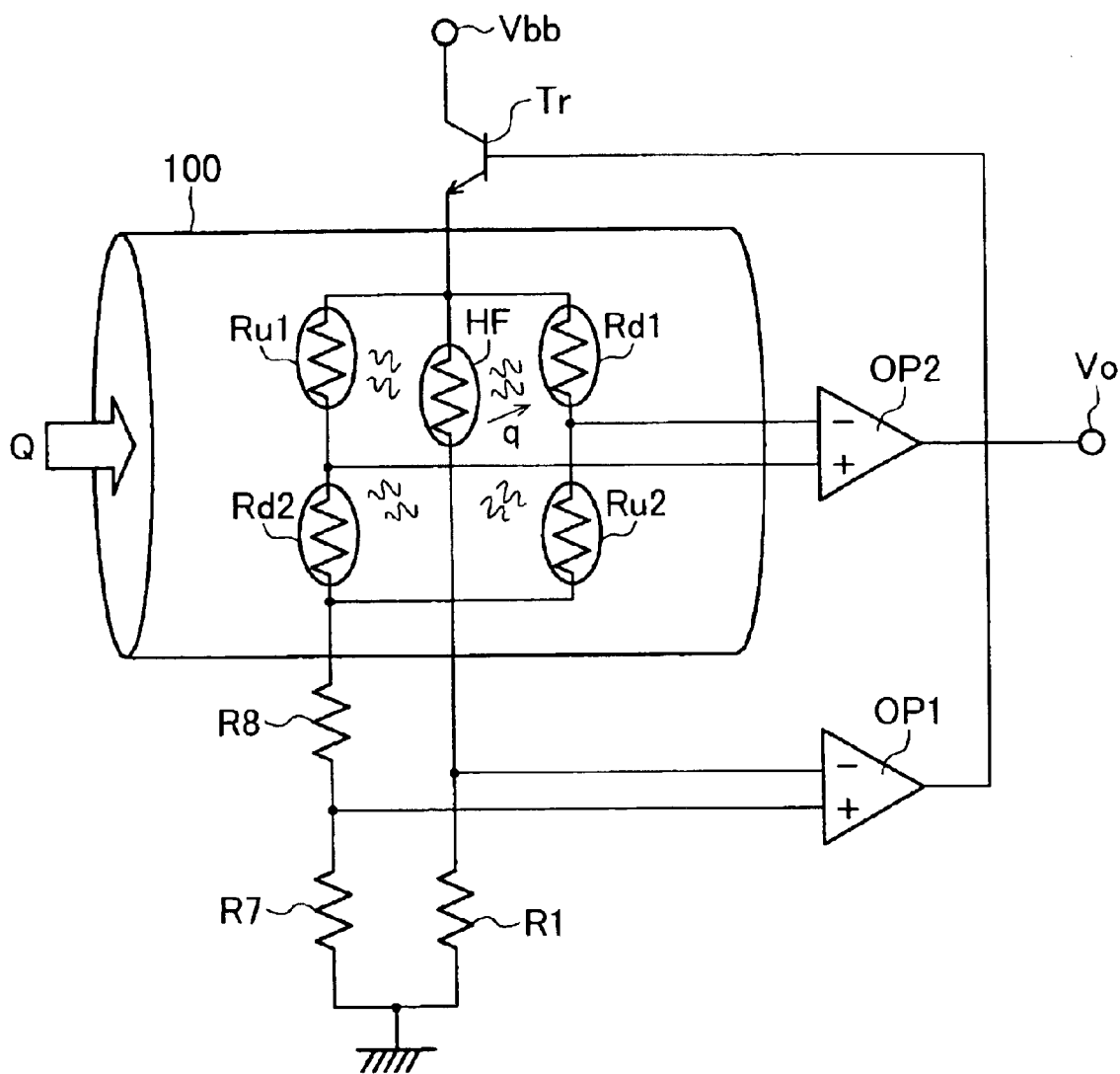
FIG. 1 is a circuit diagram of a thermal type flow measuring device according to a first embodiment of the present invention.

In FIG. 1, the heating resistor HF is grounded through a resistance R1 for monitoring a control current. Also, four temperature measuring resistors (upstream temperature measuring resistors Ru1, Ru2 and downstream temperature measuring resistors Rd1, Rd2) forming a bridge circuit are grounded through a resistance R8 for temperature compensation and a resistance R7 for adjusting a bridge balance.

It is here assumed that, as viewed on FIG. 1, the left side represents the upstream side of a flow of a fluid Q, the right side represents the downstream side, and the flow direction of the fluid Q represents a forward direction.

The above two component groups constitute respective arms (one of which comprises the heating resistor HF and the resistance R1 and the other of which comprises the resistances Ru1, Ru2, Rd1, Rd2, R8 and R7) of a bridge circuit (second bridge circuit), and a junction between the resistance R8 and the resistance R7 is connected to a positive input terminal of an operational amplifier OP1.

Further, a junction between the heating resistor HF and the resistance R1 is connected to a negative input terminal of the operational amplifier OP1. An output terminal of the operational amplifier OP1 is connected to the base of a transistor Tr. The collector of the transistor Tr is connected to a power source voltage Vbb, and the emitter thereof is connected to a top point (junction of the heating resistor HF to the upstream temperature measuring resistor Ru1 and the downstream temperature measuring resistor Rd1) of the bridge circuit.

With the circuit arrangement described above, the power source voltage Vbb is supplied to the top point of the bridge circuit through the transistor Tr, whereby the heating resistor HF is heated to a temperature not lower than the temperature of the fluid Q and is subjected to feedback control. In other words, the heating resistor HF is feedback controlled in accordance with an output signal for keeping a balance of the bridge circuit so that it is held at a predetermined temperature.

For the sake of explaining the circuit, in FIG. 1, the resistance Rd2 is illustrated as being positioned upstream of the heating resistor HF and the resistance Ru2 is illustrated as being positioned downstream of the heating resistor HF. In the actual circuit arrangement, however, the resistance Rd2 is positioned downstream of the heating resistor HF and the resistance Ru2 is positioned upstream of the heating resistor HF as described above.

Resistance values of the upstream temperature measuring resistors Ru1, Ru2 and the downstream temperature measuring resistors Rd1, Rd2 are selected to be sufficiently larger than a resistance value of the heating resistor HF. Therefore, an output voltage of the operational amplifier OP1 essentially represents a heat balance of the heating resistor HF and provides a signal depending on the flow rate.

Looking at the flow rate detecting circuitry, among the four temperature measuring resistors (i.e., the upstream temperature measuring resistor Ru1, the upstream temperature measuring resistor Ru2, the downstream temperature measuring resistor Rd1, and the downstream temperature measuring resistor Rd2) arranged upstream and downstream of the heating resistor HF so as to receive thermal influences from it, the upstream temperature measuring resistor Ru1 and the upstream temperature measuring resistor Ru2 both arranged on the upstream side are cooled depending on the flow rate of the fluid Q and their resistance values are greatly reduced.

On the other hand, the downstream temperature measuring resistor Rd1 and the downstream temperature measuring resistor Rd2 both arranged on the downstream side are also deprived of heat by the fluid, but they are exposed to the fluid Q warmed by the heating resistor HF. Hence, their temperatures rise slightly and their resistance values increase slightly.

The upstream temperature measuring resistor Ru1, the upstream temperature measuring resistor Ru2, the downstream temperature measuring resistor Rd1, and the downstream temperature measuring resistor Rd2 are connected such that the two upstream and two downstream temperature measuring resistors are positioned in respective opposite sides of a bridge circuit (first bridge circuit (which is included in the second bridge circuit)). A junction between the upstream temperature measuring resistor Ru1 and the downstream temperature measuring resistor Rd2 is connected to a positive input terminal of an operational amplifier OP2, while a junction between the downstream temperature measuring resistor Rd1 and the upstream temperature measuring resistor Ru2 is connected to a negative input terminal of the operational amplifier OP2. Hence, an output voltage Vo of the operational amplifier OP2 represents a signal depending on the flow rate of the fluid Q. Stated another way, the flow rate of the fluid can be measured in accordance with an output for keeping a balance of the first bridge circuit.

Further, in the case of the fluid flowing in the backward direction as denoted by −Q, i.e., from the right side to the left side in FIG. 1, the resistance values of the upstream temperature measuring resistors Ru1, Ru2 and the downstream temperature measuring resistors Rd1, Rd2 are increased and decreased in a reversal way to the case of the fluid flowing in the forward direction. Accordingly, it is also possible to detect whether the fluid flows in the forward direction or the backward direction.

Moreover, the resistance R8 has a role of managing the temperature coefficient of a combined resistance of the heating resistor HF and the four temperature measuring resistors (Ru1, Ru2, Rd1 and Rd2). By properly setting the resistance R8, temperature characteristics generating in the control voltage for the heating resistor HF can be adjusted.

If a control circuit for the voltage applied to the heating resistor HF is independent of control for the voltage applied to the temperature measuring resistors (Ru1, Ru2, Rd1 and Rd2), it is difficult to compensate the temperature characteristics appearing in the temperature difference signal from the temperature measuring resistors (Ru1, Ru2, Rd1 and Rd2).

In contrast, in the first embodiment of the present invention, because the temperature difference signal is obtained by controlling the voltage applied to the temperature measuring resistors (Ru1, Ru2, Rd1 and Rd2) with the use of the voltage applied to the heating resistor HF for control thereof, temperature compensation can be realized with the setting of the resistance R8 for not only the temperature characteristics generating in the control voltage for the heating resistor HF, but also the temperature characteristics appearing in the temperature difference signal from the temperature measuring resistors (Ru1, Ru2, Rd1 and Rd2).

Though not shown in detail, the heating resistor HF, the upstream temperature measuring resistors Ru1, Ru2, and the downstream temperature measuring resistors Rd1, Rd2 are mounted in a passage 100 of the fluid Q, while the other circuit section is mounted on a ceramic substrate or a printed board and is disposed in an isolated state from the interior of the passage 100. Thus, a thermal type flow measuring device with high reliability can be obtained.

With such a construction, because of the upstream temperature measuring resistors Ru1, Ru2 and the downstream temperature measuring resistors Rd1, Rd2 being arranged near the heating resistor HF to be thermally affected by it, when the heating resistor HF changes with time due to generation of heat by itself and so do the resistance value and the resistance temperature coefficient thereof, the values of the resistances Ru1, Ru2, Rd1 and Rd2 are changed at a similar gradient.

As a result, the resistances Ru1, Ru2, Rd1 and Rd2 of the bridge circuit operate so as to compensate each other, and a deviation from preset characteristics of flow rate can be reduced. Note that, in FIG. 1, flows of heat q generated from the heating resistor HF are schematically indicated by wavy lines and an arrow.

Further, because of the heating resistor HF, the upstream temperature measuring resistors Ru1, Ru2, and the downstream temperature measuring resistors Rd1, Rd2 being arranged on the same diaphragm in a close relation to each other, even when the heating resistor HF, the upstream temperature measuring resistors Ru1, Ru2, and the downstream temperature measuring resistors Rd1, Rd2 are contaminated or damaged by dust, oil, etc. in the fluid Q, they are similarly contaminated or damaged and their individual characteristics also vary similarly. Therefore, a thermal type flow measuring device having a smaller variation in output characteristics can be realized.

It is needless to say that, although an ordinary bridge circuit generates in itself some heat depending on selection of resistance values, the heat generated by the resistance itself is not taken into account with the purport of the present invention in mind.

The practical construction of the heating resistor HF, the upstream temperature measuring resistors Ru1, Ru2, and the downstream temperature measuring resistors Rd1, Rd2 according to the first embodiment of the present invention will be described below with reference to FIGS. 2 and 3.

Figure 2:
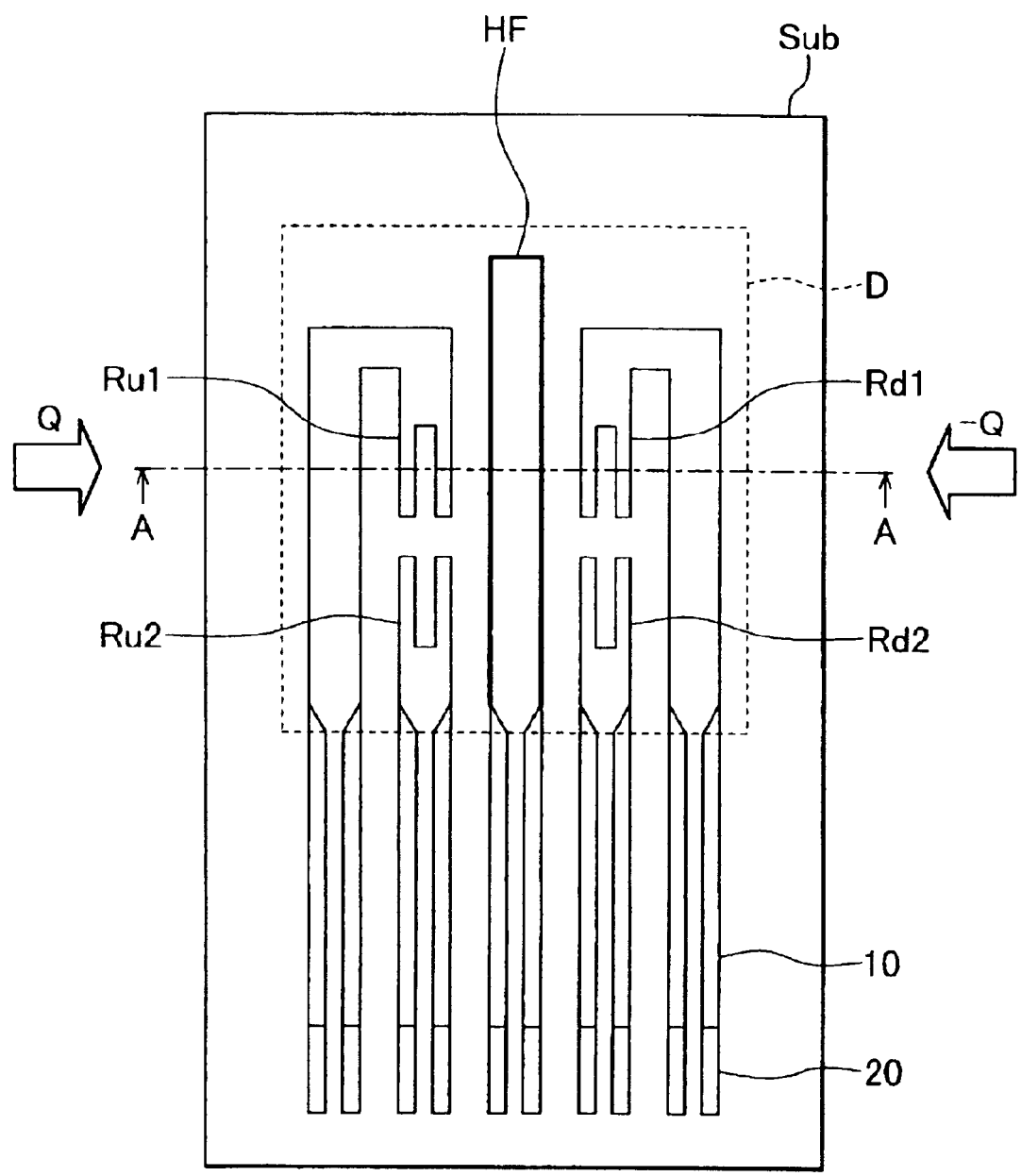
FIG. 2 is a plan view showing an arrangement of a heating resistor HF and temperature sensitive resistors Ru1, Ru2, Rd1 and Rd2 according to the first embodiment of the present invention.
Figure 3:
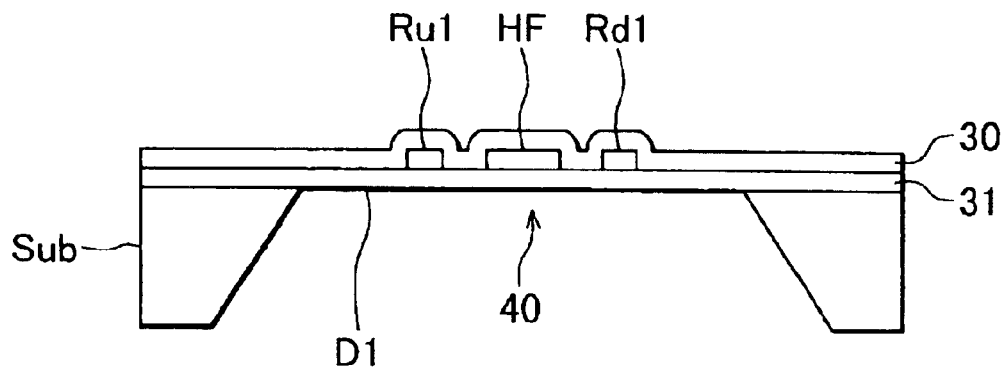
FIG. 3 is a sectional view taken along the line A—A in FIG. 2.

FIG. 2 is a plan view showing an arrangement of the heating resistor HF, the upstream temperature measuring resistors Ru1, Ru2, and the downstream temperature measuring resistors Rd1, Rd2 according to the first embodiment of the present invention, and FIG. 3 is a sectional view taken along the line A—A in FIG. 2.

As shown in FIG. 2, the heating resistor HF, the upstream temperature measuring resistors Ru1, Ru2, and the downstream temperature measuring resistors Rd1, Rd2 are formed on the same substrate Sub.

Also, as shown in FIG. 3, a portion of the substrate Sub is formed as a diaphragm D1 having a small thickness so that heat dissipation through thermal conduction is suppressed and heat transfer sensitivity with respect to the fluid Q is increased. The heating resistor HF, the upstream temperature measuring resistors Ru1, Ru2, and the downstream temperature measuring resistors Rd1, Rd2 are all formed on the diaphragm D1.

In the first embodiment of the present invention, the diaphragm D1 comprises an upper film 30 and a lower film 31 each being made of a material having a small coefficient of thermal conduction. The heating resistor HF, the upstream temperature measuring resistors Ru1, Ru2, and the downstream temperature measuring resistors Rd1, Rd2 are sandwiched between the upper film 30 and the lower film 31 from the front and back sides, i.e., from above and below as viewed on FIG. 3, to reduce not only current leaks among the heating resistor HF, the upstream temperature measuring resistors Ru1, Ru2, and the downstream temperature measuring resistors Rd1, Rd2, but also heat loss caused upon adhesion of foreign matters, moisture, etc. contained in the fluid Q.

The heating resistor HF, the upstream temperature measuring resistors Ru1, Ru2, and the downstream temperature measuring resistors Rd1, Rd2 are connected to a connecting section 20 through a wiring section 10 for electrical connection to the circuit shown in FIG. 1 via the connecting section 20.

The heating resistor HF can be made of metals such as platinum, platinum alloys, iron-based alloys and tungsten, or conductive materials for use in semiconductor chips, such as doped polysilicon and silicide. From the standpoint of reducing the number of manufacturing steps, however, it is preferable as a matter of course to employ a method of forming the upstream temperature measuring resistors Ru1, Ru2 and the downstream temperature measuring resistors Rd1, Rd2, as well as the heating resistor HF using the same material at the same time.

The above-mentioned materials cause changes with time, namely the resistance value and the resistance temperature coefficient of each material change with heat generated by itself. A rate of such time-dependent changes depends on the selected material and manufacturing method.

Figure 4:
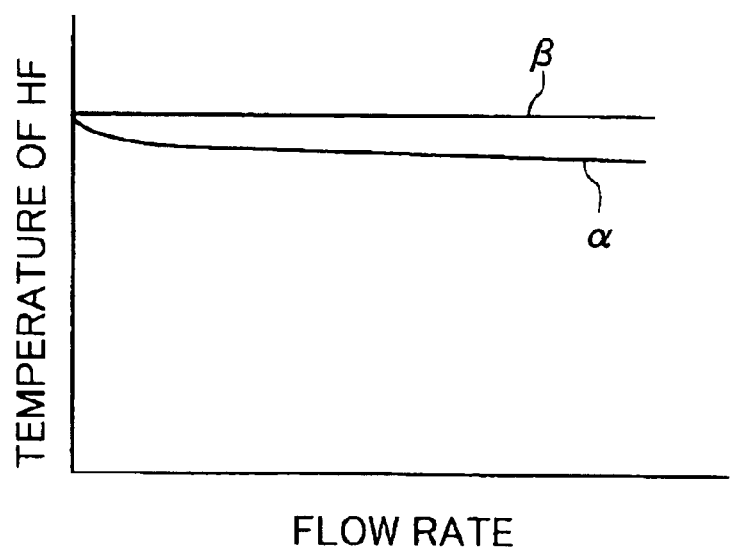
FIG. 4 is a graph for explaining temperature changes of the heating resistor HF with respect to the flow rate in the first embodiment of the present invention.

With reference to FIG. 4, a description is now made of temperature changes of the heating resistor HF with respect to the flow rate of the fluid in the first embodiment of the present invention. In FIG. 4, $\alpha$ represents the temperature of the heating resistor HF in the thermal type flow measuring device according to the first embodiment of the present invention, and $\beta$ represents the temperature of the heating resistor in the prior art wherein the heating resistor HF is controlled to keep a certain temperature difference with respect to the fluid temperature.

In the thermal type flow measuring device according to the first embodiment of the present invention, among the four temperature measuring resistors (Ru1, Ru2, Rd1 and Rd2) arranged upstream and downstream of the heating resistor HF so as to receive thermal influences from it, the temperature measuring resistors Ru1, Ru2 arranged on the upstream side are cooled depending on the flow rate of the fluid Q and hence their resistance values are reduced. On the other hand, the temperature measuring resistors Rd1, Rd2 arranged on the downstream side are exposed to the fluid Q warmed by the heating resistor HF, whereby their temperatures rise and their resistance values increase slightly. However, because values by which the resistance values of Ru1 and Ru2 decrease are larger than those by which the resistance values of Rd1 and Rd2 increase, a combined resistance value of the four temperature measuring resistors (Ru1, Ru2, Rd1 and Rd2) connected in the bridge form is reduced as a whole.

Therefore, the feedback circuit for the heating resistor HF operates to reduce the resistance value of the heating resistor HF based on the balancing action. In other words, as indicated by a in FIG. 4, the temperature of the heating resistor HF lowers gradually depending on the flow rate of the fluid and the resistance value also decreases gradually. Thus, power consumed for driving the heating resistor HF is proportional to the temperature of the heating resistor HF.

Consequently, with the first embodiment of the present invention, the power consumption in the high flow-rate region can be reduced. Likewise, since the detection sensitivity is reduced corresponding to the temperature drop of the heating resistor HF in the high flow-rate region, output noise caused by a turbulence generating in the passage 100 can also be reduced.

Furthermore, the above-mentioned combined resistance varies depending on not only changes of the flow rate, but also changes of the flow direction of the fluid. Thus, since the combined resistance of the bridge comprising the four temperature measuring resistors (Ru1, Ru2, Rd1 and Rd2) varies depending on changes of the flow rate and the flow direction of the fluid, a response at a higher speed can be realized in comparison with the prior art wherein the temperature of the heating resistor HF is controlled to be kept constant.

Additionally, in the prior art, it has been difficult to reduce the device size because a reference-purpose heat sensitive resistor CF for detecting the fluid temperature must be arranged in a position sufficiently away from the heating resistor HF to such an extent that the resistor CF receives no thermal influences from the heating resistor HF.

In contrast, with the first embodiment of the present invention, since the reference-purpose heat sensitive resistor CF can be omitted, a small-sized and inexpensive thermal type flow measuring device can be realized.

Moreover, because of employing, instead of the reference-purpose heat sensitive resistor CF, the four temperature measuring resistors (Ru1, Ru2, Rd1 and Rd2) arranged on the diaphragm D1 in a state sufficiently thermally insulated from the surroundings, even when the temperature of a wall defining the passage 100 differs from the temperature of the fluid Q, it is possible to reduce an error caused by the wall temperature thermally conducted from the wall of the fluid passage 100.

With the construction described above, a thermal type flow measuring device can be realized which can suppress a characteristic variation resulting from time-dependent changes of the heating resistor HF, can reduce power consumption and output noise, can provide a quick response, can suppress a characteristic variation caused by contamination or damage, can be manufactured in a smaller size at a lower cost, can diminish influences from the wall temperature of the fluid passage, and can perform flow measurement with high accuracy.

Next, the construction of a thermal type flow measuring device according to a second embodiment of the present invention will be described below with reference to FIGS. 5 to 7.

The arrangement of an electric circuit of the thermal type flow measuring device according to the second embodiment of the present invention will first be described with reference to FIG. 5. Note that, in FIG. 5, the same symbols as those in FIG. 1 denote the same components.

Figure 5:
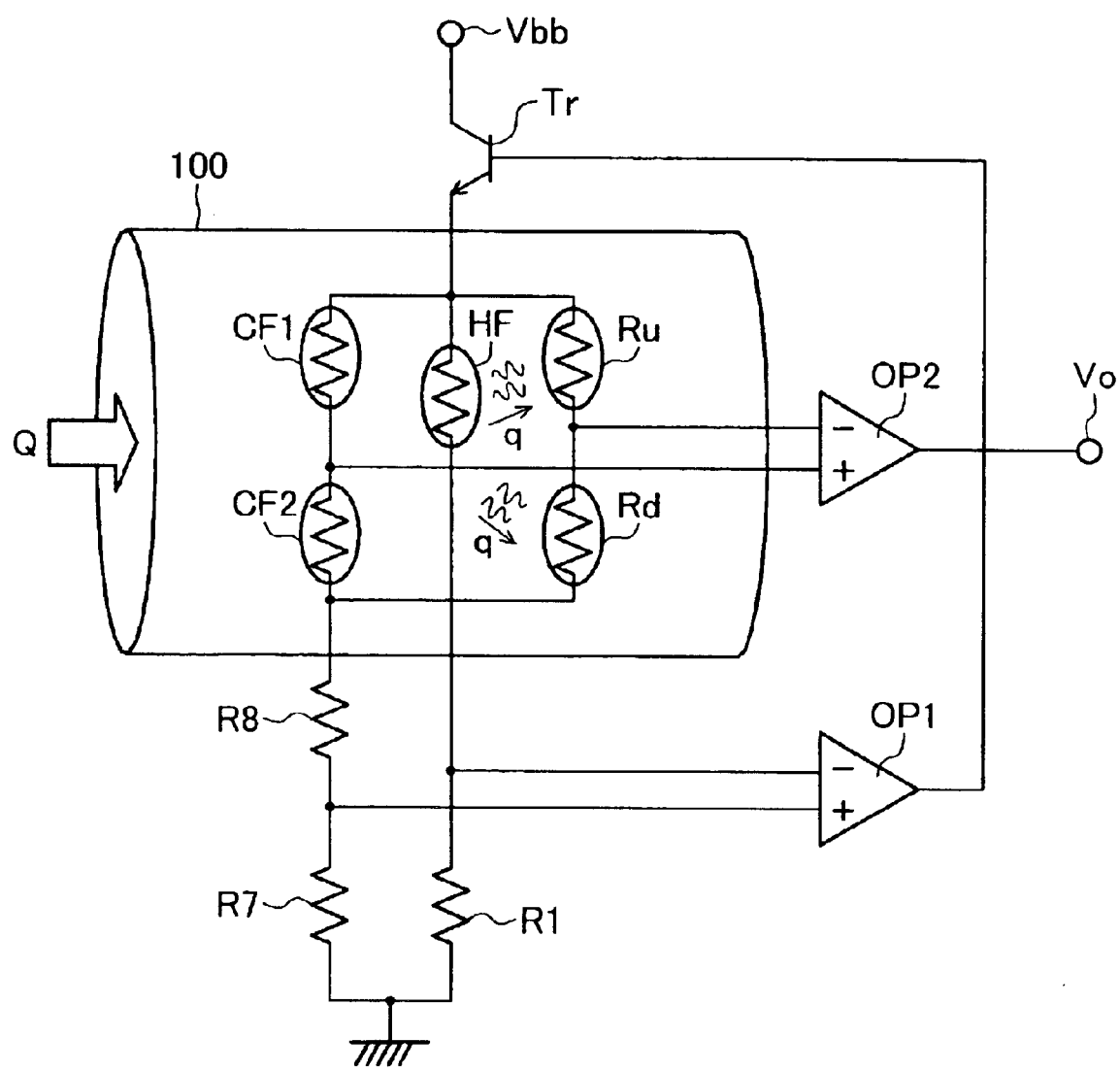
FIG. 5 is a circuit diagram of a thermal type flow measuring device according to a second embodiment of the present invention.

This embodiment of FIG. 5 differs from the embodiment of FIG. 1 in that the former (FIG. 5) employs reference-purpose heat sensitive resistors CF1 and CF2 instead of the upstream temperature measuring resistor Ru1 and the downstream temperature measuring resistor Rd2.

A heating resistor HF is grounded through a resistance R1. Also, two temperature measuring resistors (Ru, Rd) and two reference-purpose heat sensitive resistors CF1, CF2 forming a bridge are connected in series to a resistance R8 and a resistance R7.

Those two component groups constitute respective arms (one of which comprises the heating resistor HF and the resistance R1 and the other of which comprises the reference-purpose heat sensitive resistors CF1, CF2 and the temperature measuring resistances Ru, Rd) of the bridge, and a junction between the resistance R8 and the resistance R7 is connected to a positive input terminal of an operational amplifier OP1.

Further, a junction between the heating resistor HF and the resistance R1 is connected to a negative input terminal of the operational amplifier OP1. An output terminal of the operational amplifier OP1 is connected to the base of a transistor Tr. The collector of the transistor Tr is connected to a power source voltage Vbb, and the emitter thereof is connected to a top point (junction of the heating resistor HF to the reference-purpose heat sensitive resistor CF1 and the temperature measuring resistor Ru) of the bridge.

With the circuit arrangement described above, the heating resistor HF is heated to a temperature not lower than the temperature of the fluid Q and is subjected to feedback control.

Resistance values of the upstream temperature measuring resistor Ru, the downstream temperature measuring resistor Rd, and the reference-purpose heat sensitive resistors CF1, CF2 are selected to be sufficiently larger than that of the heating resistor HF. Therefore, an output voltage of the operational amplifier OP1 essentially represents a heat balance of the heating resistor HF and provides a signal depending on the flow rate.

Looking at the flow rate detecting circuitry, among the two temperature measuring resistors (Ru, Rd) arranged upstream and downstream of the heating resistor HF so as to receive thermal influences from it, the upstream temperature measuring resistor Ru arranged on the upstream side is cooled depending on the flow rate of the fluid Q and its resistance values is greatly reduced. The downstream temperature measuring resistor Rd arranged on the downstream side is exposed to the fluid Q warmed by the heating resistor HF. Therefore, its temperature rises and its resistance value increases slightly.

The reference-purpose heat sensitive resistors CF1, CF2 are disposed so that they receive no thermal influences from the heating resistor HF. The upstream temperature measuring resistor Ru and the downstream temperature measuring resistor Rd are connected in series to each other, and they are also connected in series to the reference-purpose heat sensitive resistors CF1, CF2. Those two resistor groups are connected to serve as respective arms of the bridge.

Further, a junction between the upstream temperature measuring resistor Ru and the downstream temperature measuring resistor Rd is connected to a negative input terminal of an operational amplifier OP2, while a junction between the reference-purpose heat sensitive resistors CF1 and CF2 is connected to a positive input terminal of the operational amplifier OP2. Accordingly, an output voltage Vo of the operational amplifier OP2 represents a signal depending on the flow rate and the flow direction of the fluid.

Further, in the case of the fluid flowing in the backward direction as denoted by −Q, the resistance values of the upstream temperature measuring resistor Ru and the downstream temperature measuring resistor Rd are increased and decreased in a reversal way to the case of the fluid flowing in the forward direction. Accordingly, it is also possible to detect whether the fluid flows in the forward direction or the backward direction.

With such a construction, because of the upstream temperature measuring resistor Ru and the downstream temperature measuring resistor Rd being arranged near the heating resistor HF to be thermally affected by it, when the heating resistor HF changes with time due to generation of heat by itself and so do the resistance value and the resistance temperature coefficient thereof, the values of the resistance Ru and the downstream temperature measuring resistor Rd are changed at a similar gradient.

As a result, the bridge circuit operates to make compensation, and a deviation from preset characteristics of flow rate can be reduced. Further, a thermal type flow measuring device can be realized which has a smaller characteristic variation even when the heating resistor HF, the upstream temperature measuring resistor Ru, and the downstream temperature measuring resistor Rd are contaminated or damaged by dust, oil, etc. in the fluid Q.

The construction of the heating resistor HF, the upstream temperature measuring resistor Ru, the downstream temperature measuring resistor Rd, and the reference-purpose heat sensitive resistors CF1, CF2 according to the second embodiment of the present invention will now be described with reference to FIGS. 6 and 7.

Figure 6:
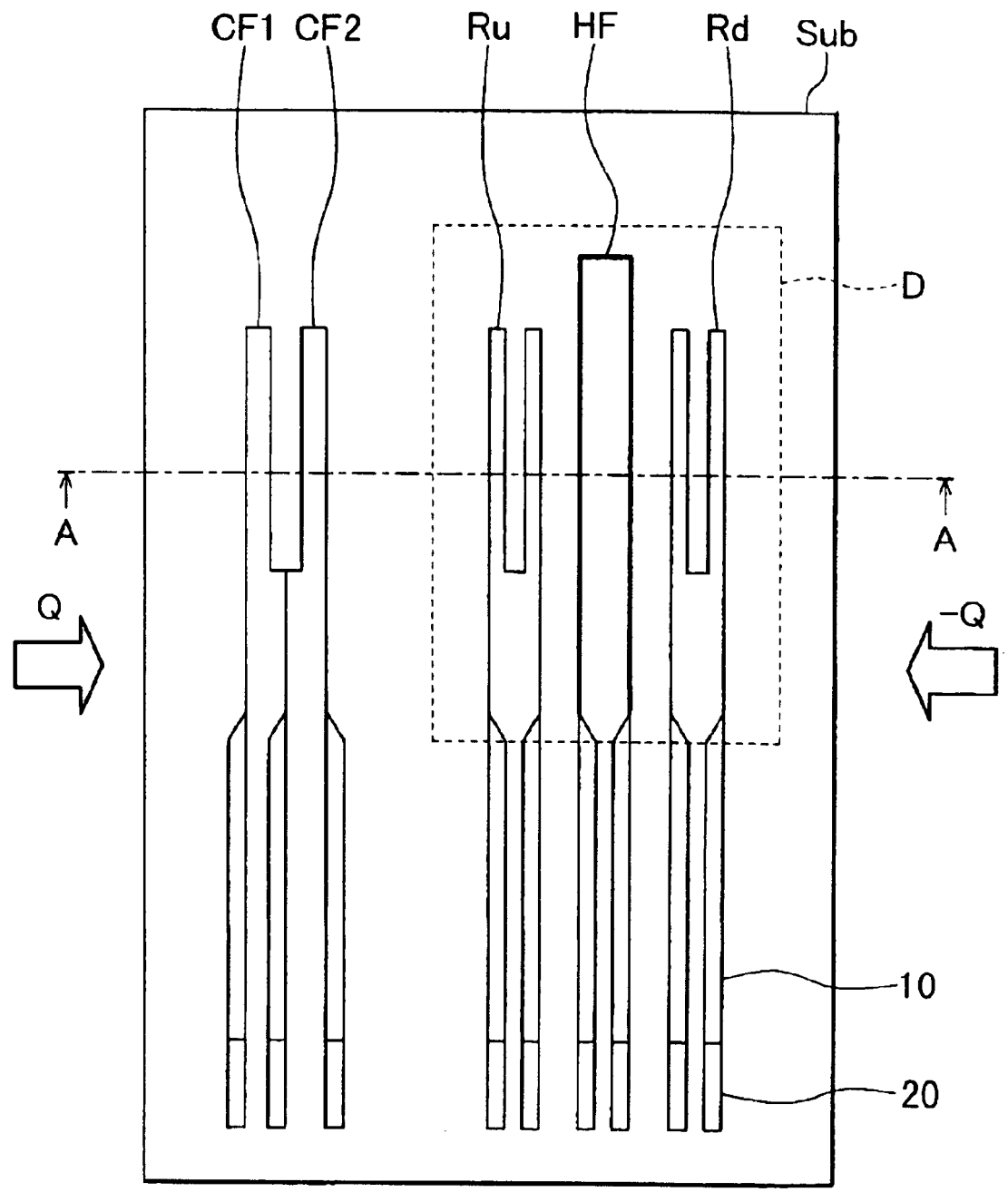
FIG. 6 is a plan view showing an arrangement of a heating resistor HF, reference-purpose heat sensitive resistors CF1, CF2, and temperature sensitive resistors Ru, Rd according to the second embodiment of the present invention.
Figure 7:
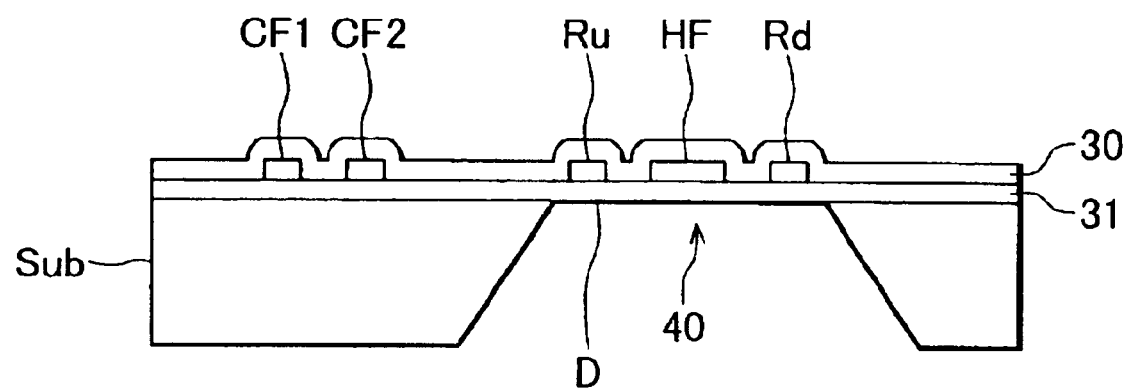
FIG. 7 is a sectional view taken along the line A—A in FIG. 6.

FIG. 6 is a plan view showing an arrangement of the heating resistor HF, the upstream temperature measuring resistor Ru, the downstream temperature measuring resistor Rd, and the reference-purpose heat sensitive resistors CF1, CF2 according to the second embodiment of the present invention, and FIG. 7 is a sectional view taken along the line A—A in FIG. 6.

As shown in FIG. 6, the heating resistor HF, the upstream temperature measuring resistor Ru, the downstream temperature measuring resistor Rd, and the reference-purpose heat sensitive resistors CF1, CF2 are formed on the same substrate Sub.

Also, as shown in FIG. 7, a portion of the substrate Sub is formed as a diaphragm D having a small thickness so that heat dissipation through thermal conduction is suppressed and heat transfer sensitivity with respect to the fluid Q is increased.

The heating resistor HF, the upstream temperature measuring resistor Ru, and the downstream temperature measuring resistor Rd are formed on the diaphragm D. On the other hand, the reference-purpose heat sensitive resistors CF1, CF2 are formed on a thick portion of the substrate Sub at a position upstream of the upstream temperature measuring resistor Ru where the reference-purpose heat sensitive resistors CF1, CF2 are less thermally affected by the heating resistor HF.

Furthermore, the heating resistor HF, the upstream temperature measuring resistor Ru, the downstream temperature measuring resistor Rd, and the reference-purpose heat sensitive resistors CF1, CF2 are sandwiched between an upper film 30 and a lower film 31 from the front and back sides, i.e., from above and below as viewed on FIG. 7, to reduce not only current leaks among the heating resistor HF, the upstream temperature measuring resistor Ru, the downstream temperature measuring resistor Rd, and the reference-purpose heat sensitive resistors CF1, CF2, but also heat loss caused upon adhesion of foreign matters, moisture, etc. contained in the fluid Q.

In the thermal type flow measuring device according to the second embodiment of the present invention, among the two temperature measuring resistors (Ru, Rd) arranged upstream and downstream of the heating resistor HF so as to receive thermal influences from it, the resistor Ru arranged on the upstream side is cooled depending on the flow rate of the fluid Q and hence its resistance value is reduced. The resistor Rd arranged on the downstream side is exposed to the fluid Q warmed by the heating resistor HF, whereby its temperature rises and its resistance value increases.

Meanwhile, the resistance values of the reference-purpose heat sensitive resistors CF1, CF2 are not changed because they are arranged at a position free from thermal influences from the heating resistor HF.

Therefore, a combined resistance value of the four resistors (Ru, Rd, CF1 and CF2) connected in the bridge form is reduced as a whole. At this time, the balancing action of the feedback circuit operates to reduce the resistance value of the heating resistor HF. In comparison with the first embodiment described above, however, temperature changes of the heating resistor HF depending on the flow rate of the fluid can be made smaller and a wider dynamic range can be obtained in the high flow-rate region.

According to the second embodiment of the present invention having the construction described above, a thermal type flow measuring device can be realized which can suppress a characteristic variation resulting from time-dependent changes of the heating resistor HF, can provide a wider dynamic range in the high flow-rate region, and can perform flow measurement with high accuracy.

Next, the construction of a thermal type flow measuring device according to a third embodiment of the present invention will be described below with reference to FIGS. 8, 9, 10 and 11.

The third embodiment of the present invention represents the case of applying the present invention to a thermal type flow measuring device in which a temperature control bridge circuit for the heating resistor HF is independent of a temperature difference bridge circuit for producing a flow rate signal and a direction.

The circuit arrangement of the thermal type flow measuring device according to the third embodiment of the present invention will first be described with reference to FIG. 8.

Figure 8:
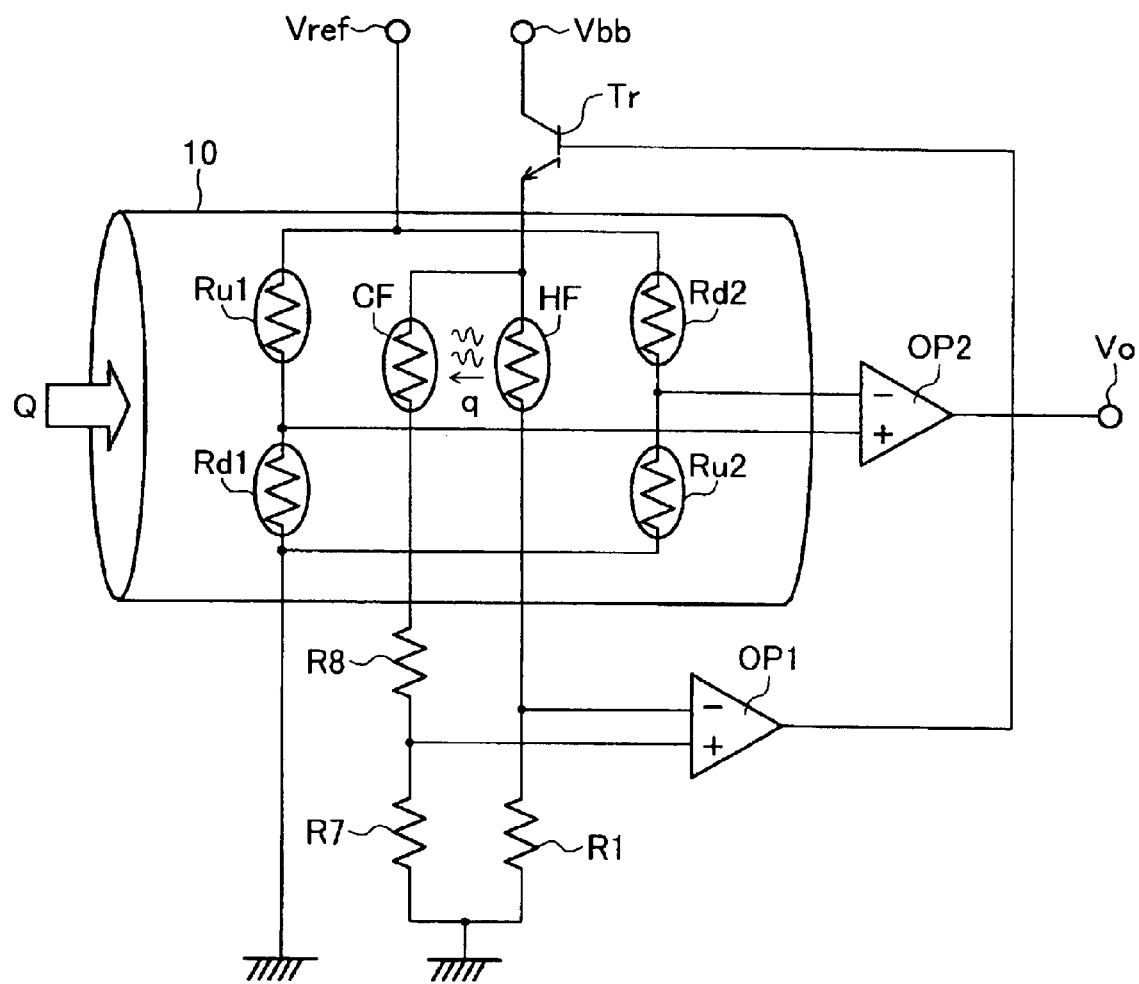
FIG. 8 is a circuit diagram of a thermal type flow measuring device according to a third embodiment of the present invention.

In FIG. 8, one end of a heating resistor HF is grounded through a resistance R1. Also, one end of a reference-purpose heat sensitive resistor CF is grounded through a resistance R8 and a resistance R7. The other end of the heating resistor HF is connected to the other end of the reference-purpose heat sensitive resistor CF. The heating resistor HF, the reference-purpose heat sensitive resistor CF, and the resistances R1, R8 and R7 form a bridge circuit.

A junction between the resistance R8 and the resistance R7 is connected to a positive input terminal of an operational amplifier OP1, while a junction between the heating resistor HF and the resistance R1 is connected to a negative input terminal of the operational amplifier OP1. An output terminal of the operational amplifier OP1 is connected to the base of a transistor Tr.

The collector of the transistor Tr is connected to a power source voltage Vbb, and the emitter thereof is connected to a top point (junction between the heating resistor HF and the reference-purpose heat sensitive resistor CF) of the bridge circuit. With such a circuit arrangement, the power source voltage Vbb is supplied to the heating resistor HF through the transistor Tr, whereby the heating resistor HF is heated to a temperature not lower than the temperature of the fluid Q and is subjected to feedback control.

Further, the resistance R8 has a role of managing the temperature coefficient of a combined resistance of the heating resistor HF and the reference-purpose heat sensitive resistor CF. By properly setting the resistance R8, temperature characteristics generating in the control voltage for the heating resistor HF can be adjusted.

In the prior art, for detecting the temperature of the fluid Q, the reference-purpose heat sensitive resistor CF is arranged so as not to receive thermal influences from the heating resistor HF, and the heating resistor HF is heated to be kept at a certain temperature relative to the temperature of the fluid Q.

In contrast, in the third embodiment of the present invention, the reference-purpose heat sensitive resistor CF is arranged at a position where it receives thermal influences q from the heating resistor HF. Wavy lines in FIG. 8 schematically represent the thermal influences q.

With such a construction, because of the reference-purpose heat sensitive resistor CF being arranged near the heating resistor HF to be thermally affected by it, when the heating resistor HF changes with time due to generation of heat by itself and so do the resistance value and the resistance temperature coefficient thereof, the values of the reference-purpose heat sensitive resistor CF and the heating resistor HF are changed at a similar gradient.

As a result, the reference-purpose heat sensitive resistor CF and the heating resistor HF operate so as to compensate each other in the bridge circuit, and a deviation from preset characteristics of flow rate with the time-dependent changes can be reduced.

Further, because the heating resistor HF and the reference-purpose heat sensitive resistor CF are arranged on the same diaphragm in a close relation to each other, they are similarly contaminated or damaged and their individual characteristics also vary similarly. Therefore, a thermal type flow measuring device having a smaller characteristic variation can be realized.

A flow rate signal and a flow direction signal are obtained as follows. Among the four temperature measuring resistors (i.e., the upstream temperature measuring resistor Ru1, the upstream temperature measuring resistor Ru2, the downstream temperature measuring resistor Rd1, and the downstream temperature measuring resistor Rd2) arranged upstream and downstream of the heating resistor HF so as to receive thermal influences from it, the upstream temperature measuring resistor Ru1 and the upstream temperature measuring resistor Ru2 both arranged on the upstream side are cooled depending on the flow rate of the fluid Q and their resistance values are reduced. The downstream temperature measuring resistor Rd1 and the downstream temperature measuring resistor Rd2 both arranged on the downstream side are exposed to the fluid Q warmed by the heating resistor HF. Hence, their temperatures rise and their resistance values increase.

The upstream temperature measuring resistor Ru1, the upstream temperature measuring resistor Ru2, the downstream temperature measuring resistor Rd1, and the downstream temperature measuring resistor Rd2 are connected such that the two upstream and two downstream temperature measuring resistors are positioned in respective opposite sides of a bridge circuit.

The upstream temperature measuring resistor Ru1 is grounded through the downstream temperature measuring resistor Rd1, and a junction between the upstream temperature measuring resistor Ru1 and the downstream temperature measuring resistor Rd1 is connected to a positive input terminal of an operational amplifier OP2.

Also, the downstream temperature measuring resistor Rd is grounded through the upstream temperature measuring resistor Ru, and a junction between the downstream temperature measuring resistor Rd2 and the upstream temperature measuring resistor Ru2 is connected to a negative input terminal of the operational amplifier OP2. Further, a reference voltage source Vref is connected to both the upstream temperature measuring resistor Ru1 and the downstream temperature measuring resistor Rd2.

Hence, an output voltage Vo of the operational amplifier OP2 produces a signal depending on the flow rate and the flow direction of the fluid Q.

The construction of the heating resistor HF, the reference-purpose heat sensitive resistor CF, the upstream temperature measuring resistors Ru1, Ru2, and the downstream temperature measuring resistors Rd1, Rd2 according to the third embodiment of the present invention will now be described with reference to FIGS. 9, 10 and 11 which are plan views of the heating resistor HF, the reference-purpose heat sensitive resistor CF, and the temperature sensitive resistors Ru1, Ru2, Rd1 and Rd2.

Figure 9:
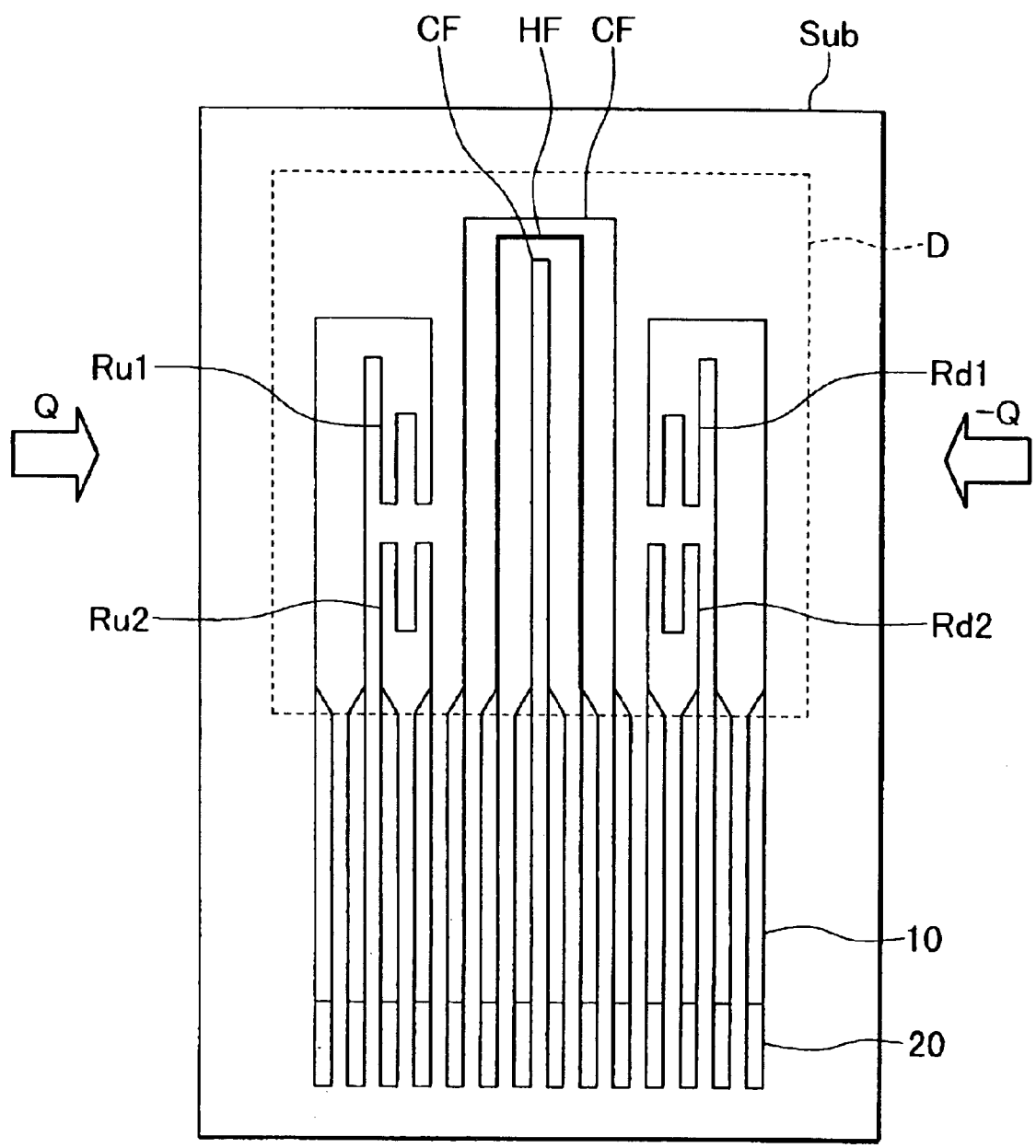
FIG. 9 is a plan view showing an arrangement of a heating resistor HF, a reference-purpose heat sensitive resistor CF, and temperature sensitive resistors Ru1, Ru2, Rd1 and Rd2 according to the third embodiment of the present invention.

As shown in FIG. 9, the heating resistor HF, the reference-purpose heat sensitive resistor CF, the upstream temperature measuring resistors Ru1, Ru2, and the downstream temperature measuring resistors Rd1, Rd2 are formed on the same substrate Sub.

Although a sectional view of the heating resistor HF, etc. is not shown, a portion of the substrate Sub is formed as a diaphragm D having a small thickness so that heat dissipation through thermal conduction is suppressed and heat transfer sensitivity with respect to the fluid Q is increased.

The heating resistor HF, the reference-purpose heat sensitive resistor CF, the upstream temperature measuring resistors Ru1, Ru2, and the downstream temperature measuring resistors Rd1, Rd2 are formed on the diaphragm D such that the reference-purpose heat sensitive resistor CF, the upstream temperature measuring resistors Ru1, Ru2, and the downstream temperature measuring resistors Rd1, Rd2 receive thermal influences from the heating resistor HF.

Also, the heating resistor HF has an inverted U-shape and the reference-purpose heat sensitive resistor CF is arranged in a state split corresponding to an inner region and an outer region of the inverted-U-shape heating resistor HF, thus causing the temperature of the reference-purpose heat sensitive resistor CF to be held coincident with the temperature of the heating resistor HF.

Though not shown, the reference-purpose heat sensitive resistor CF arranged inside the heating resistor HF is connected in series to the reference-purpose heat sensitive resistor CF arranged outside the heating resistor HF.

With the construction described above, a thermal type flow measuring device can be realized which can suppress a characteristic variation resulting from time-dependent changes of the heating resistor HF, can achieve reduction of both power consumption and output noise, and can suppress a characteristic variation caused by contamination or damage.

Figure 10:
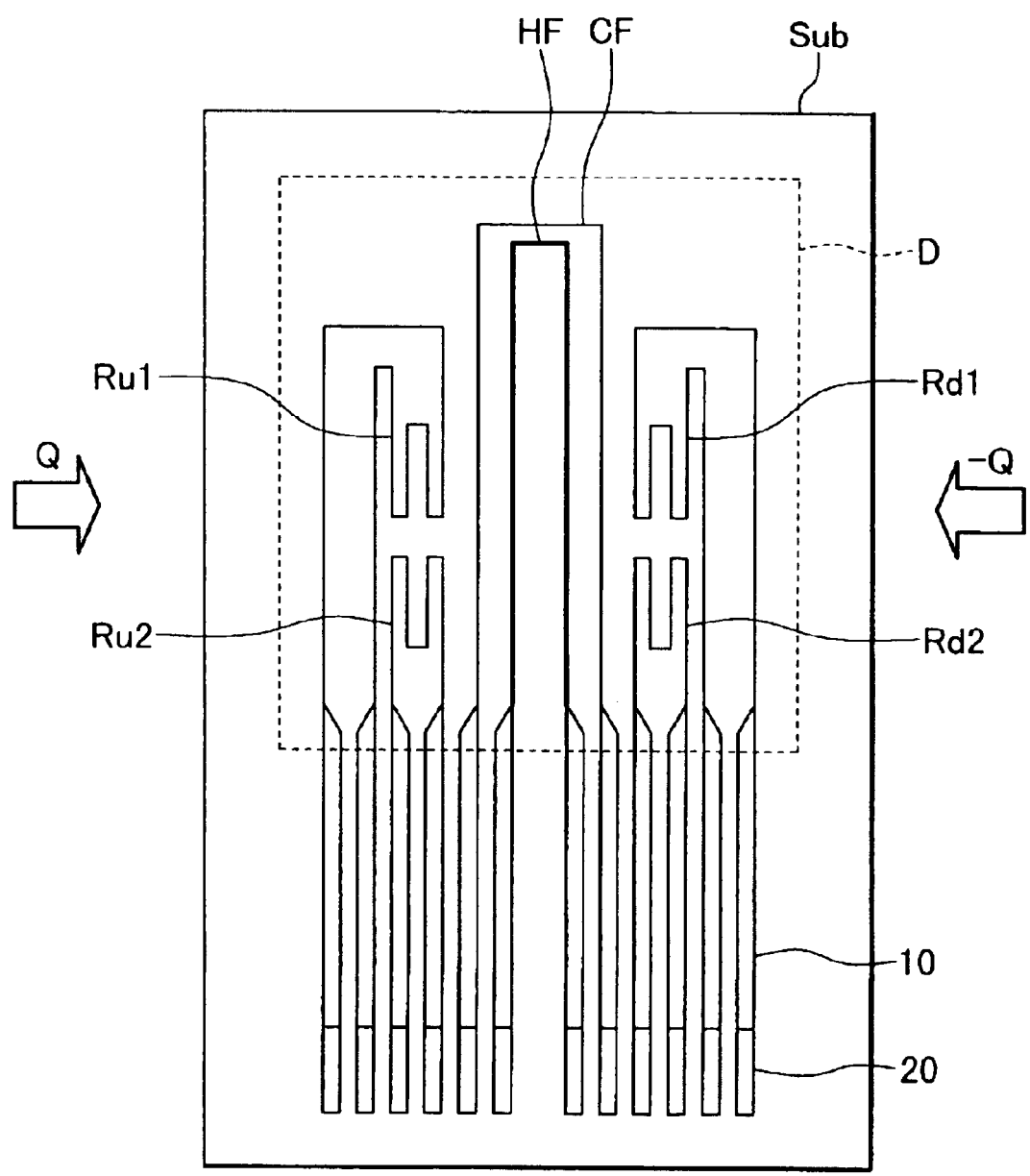
FIG. 10 shows one modification of the embodiment shown in FIG. 9.

FIG. 10 shows an example modified from the embodiment of FIG. 9 in that the reference-purpose heat sensitive resistor CF arranged inside the U-shaped heating resistor HF is omitted. By arranging the reference-purpose heat sensitive resistor CF only outside the heating resistor HF like the modification shown in FIG. 10, a portion of the reference-purpose heat sensitive resistor CF located on the upstream side in the flow direction of the fluid Q causes a larger temperature drop and its resistance value reduces. A portion of the reference-purpose heat sensitive resistor CF located on the downstream side causes a temperature rise with a smaller temperature change than that in the upstream portion and its resistance value increases correspondingly.

Accordingly, the resistance value of the reference-purpose heat sensitive resistor CF is reduced as a whole. Hence, the modification shown in FIG. 10 has an effect of providing a larger temperature drop of the heating resistor HF with respect to the flow rate of the fluid in comparison with the above-mentioned embodiment of FIG. 9.

Figure 11:
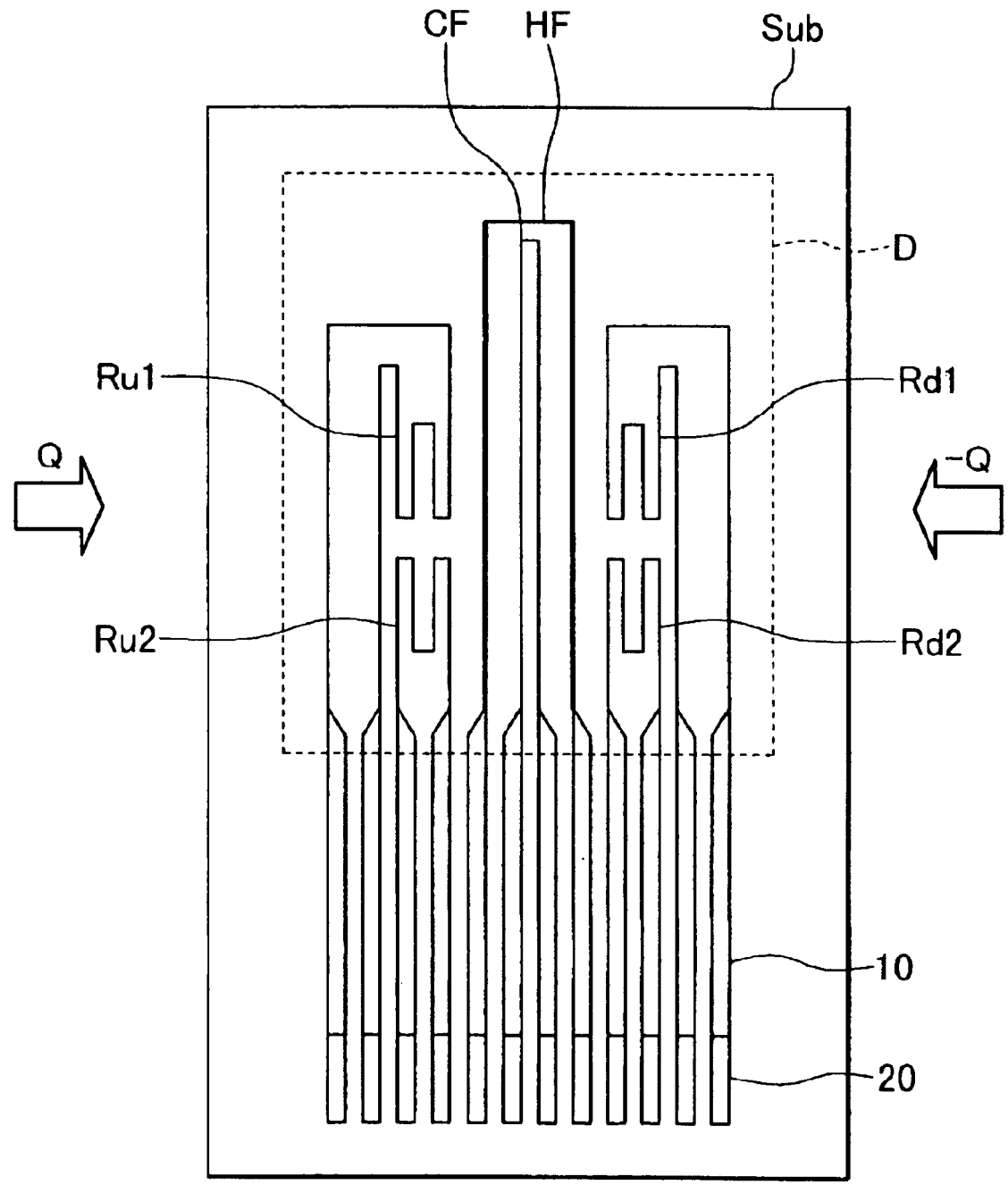
FIG. 11 shows another modification of the embodiment shown in FIG. 9.

FIG. 11 shows another example modified from the embodiment of FIG. 9 in that the reference-purpose heat sensitive resistor CF arranged outside the U-shaped heating resistor HF is omitted. By arranging the reference-purpose heat sensitive resistor CF only inside the heating resistor HF like the modification-shown in FIG. 11, a smaller temperature difference occurs between portions of the reference-purpose heat sensitive resistor CF located on the upstream and downstream sides with respect to the fluid flow.

Accordingly, the overall resistance value of the reference-purpose heat sensitive resistor CF is larger than that in the embodiment of FIG. 9. Hence, the modification shown in FIG. 11 has an effect of providing a smaller temperature drop of the heating resistor HF with respect to the flow rate of the fluid in comparison with the above-mentioned embodiment of FIG. 9.

Figure 12:
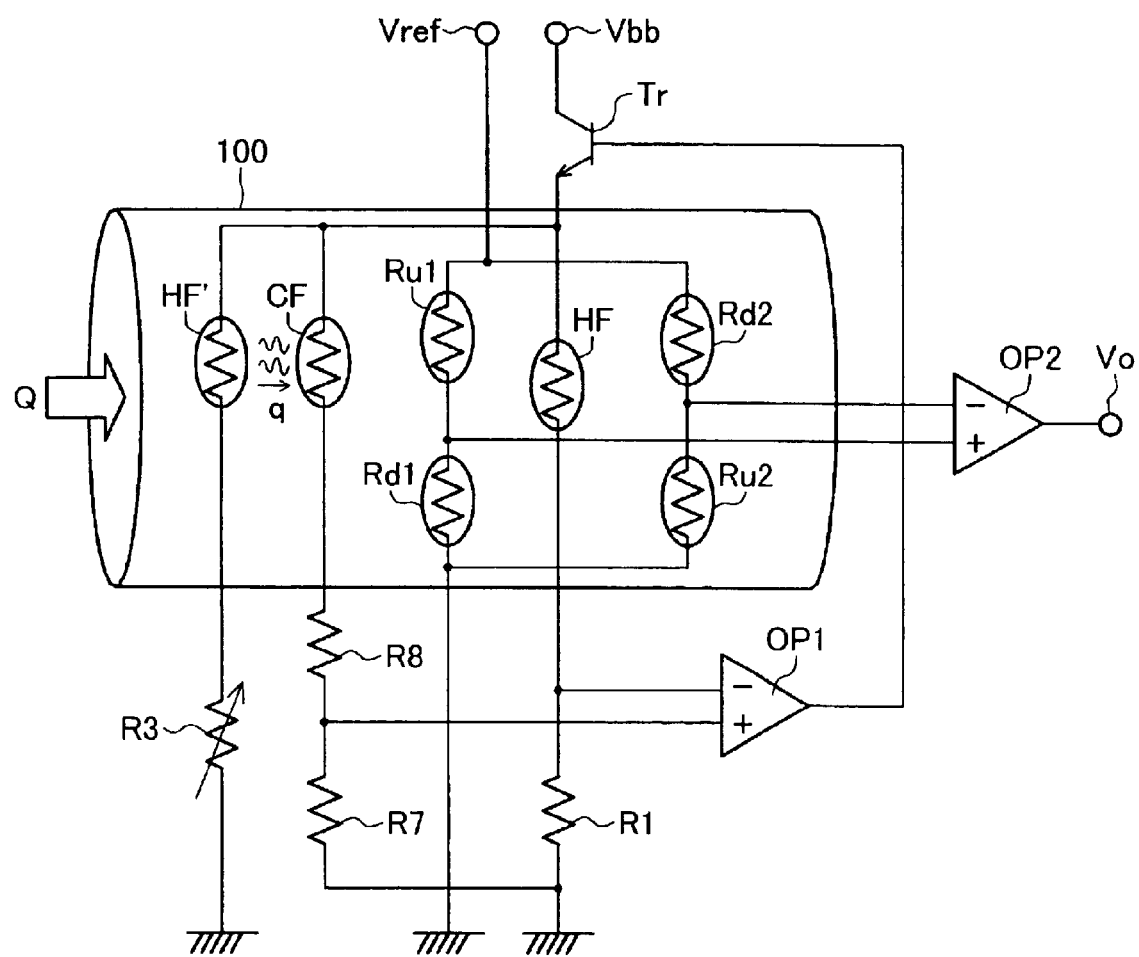
FIG. 12 is a circuit diagram of a thermal type flow measuring device according to a fourth embodiment of the present invention.

Next, the construction of a thermal type flow measuring device according to a fourth embodiment of the present invention will be described below with reference to FIGS. 12 to 14.

The fourth embodiment of the present invention represents the case in which the reference-purpose heat sensitive resistor CF in the temperature control bridge circuit for the heating resistor HF is heated by a heating means HF' other than the heating resistor HF.

The circuit arrangement of the thermal type flow measuring device according to the fourth embodiment of the present invention will first be described with reference to FIG. 12.

A heating resistor HF is grounded through a resistance R1. Also, a reference-purpose heat sensitive resistor CF is grounded through a resistance R8 and a resistance R7. The heating resistor HF, the reference-purpose heat sensitive resistor CF, and the resistances R1, R8 and R7 form a bridge circuit.

A junction between the resistance R8 and the resistance R7 is connected to a positive input terminal of an operational amplifier OP1, while a junction between the heating resistor HF and the resistance R1 is connected to a negative input terminal of the operational amplifier OP1. An output terminal of the operational amplifier OP1 is connected to the base of a transistor Tr. The collector of the transistor Tr is connected to a power source voltage Vbb. Further, the emitter of the transistor Tr is connected to a top point (junction between the heating resistor HF and the reference-purpose heat sensitive resistor CF) of the bridge circuit.

With such a circuit arrangement, the power source voltage Vbb is supplied to the bridge circuit through the transistor Tr, whereby the heating resistor HF is heated to a temperature not lower than the temperature of the fluid Q and is subjected to feedback control.

In addition, a heating means HF' is connected to the emitter of the transistor Tr and is grounded through an adjusting resistance R3. Stated another way, the heating means HF' and the adjusting resistance R3 are connected in parallel to the heating resistor HF and are also connected in parallel to the reference-purpose heat sensitive resistor CF.

By setting the adjusting resistance R3 to any desired value, the temperature of the heating means HF' can be adjusted.

One end of the upstream temperature measuring resistor Ru1 is grounded through the downstream temperature measuring resistor Rd1, and one end of the downstream temperature measuring resistor Rd2 is grounded through the upstream temperature measuring resistor Ru2. Further, the other end of the upstream temperature measuring resistor Ru1 and the other end of the downstream temperature measuring resistor Rd2 are both connected to a reference voltage source Vref.

A junction between the resistances Ru1 and Rd1 is connected to a positive input terminal of an operational amplifier OP2, and a junction between the resistances Rd2 and Ru2 is connected to a negative input terminal of the operational amplifier OP2.

In the prior art, for detecting the temperature of the fluid Q, the reference-purpose heat sensitive resistor CF is arranged with due consideration from the viewpoint of avoiding thermal influences from the heating resistor HF, and the heating resistor HF is heated to be kept at a certain temperature relative to the temperature of the fluid Q.

In contrast, in the fourth embodiment of the present invention, the reference-purpose heat sensitive resistor CF is arranged at a position where it receives thermal influences q from the heating means HF'. Wavy lines in FIG. 12 schematically represent the thermal influences q.

With such a construction, because of the reference-purpose heat sensitive resistor CF being arranged near the heating means HF' to be thermally affected by it, when the heating resistor HF changes with time due to generation of heat by itself and so do the resistance value and the resistance temperature coefficient thereof, the resistance values of the heating means HF' and the reference-purpose heat sensitive resistor CF are changed at a similar tendency.

As a result, the bridge circuit operates to make compensation, and a deviation from preset characteristics of flow rate with the time-dependent changes can be reduced. Furthermore, a thermal type flow measuring device can be realized in which a characteristic variation caused by contamination or damage of the heating resistor HF, the upstream temperature measuring resistors Ru1, Ru2 and the downstream temperature measuring resistors Rd1, Rd2 is suppressed.

The construction of the heating resistor HF, the reference-purpose heat sensitive resistor CF, the heating means HF', the upstream temperature measuring resistors Ru1, Ru2, and the downstream temperature measuring resistors Rd1, Rd2 according to the fourth embodiment of the present invention will now be described with reference to FIGS. 13 and 14.

Figure 13:
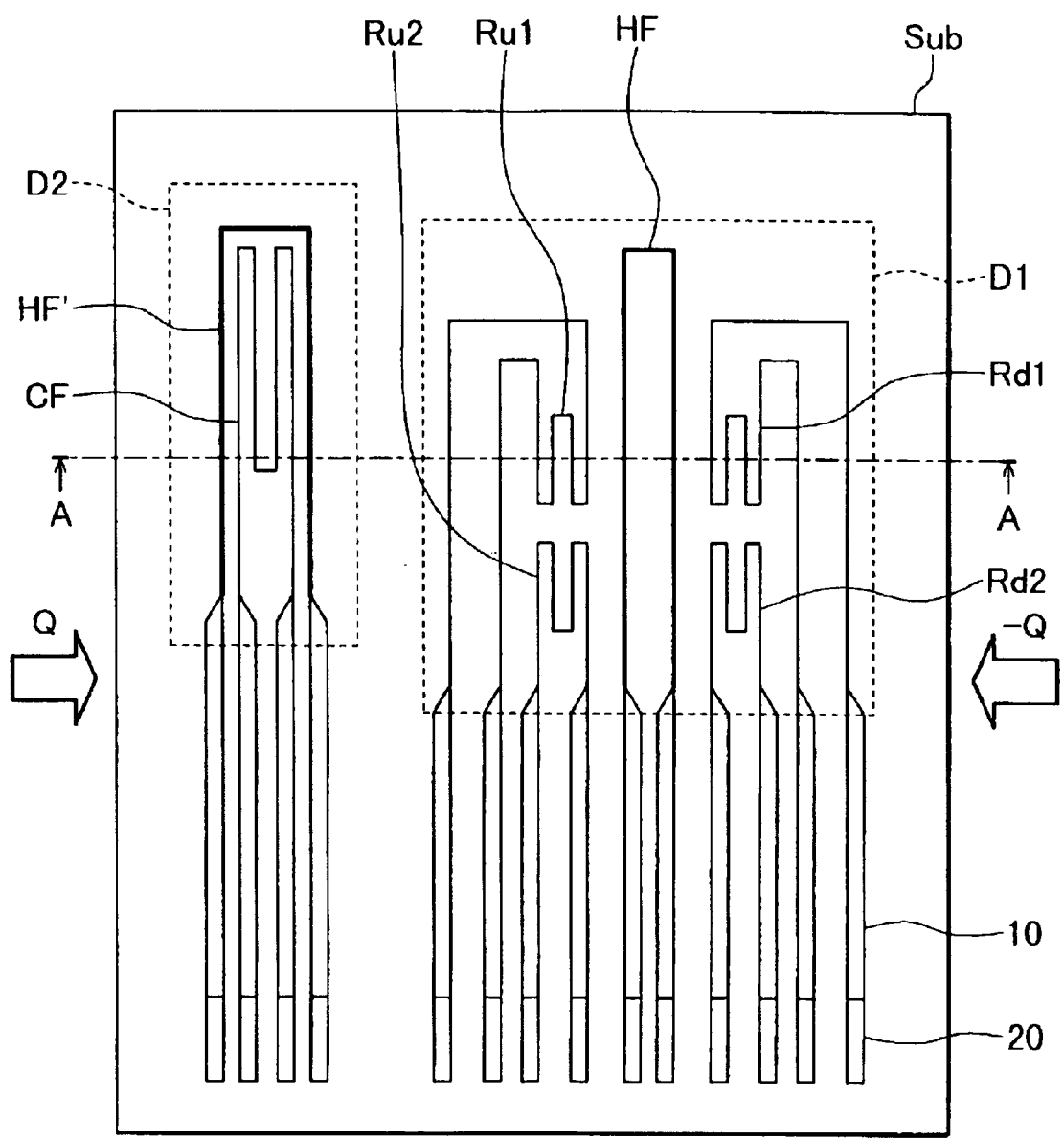
FIG. 13 is a plan view showing an arrangement of a heating resistor HF, a reference-purpose heat sensitive resistor CF, a heating resistor HF', and temperature sensitive resistors Ru1, Ru2, Rd1 and Rd2 according to the fourth embodiment of the present invention.
Figure 14:
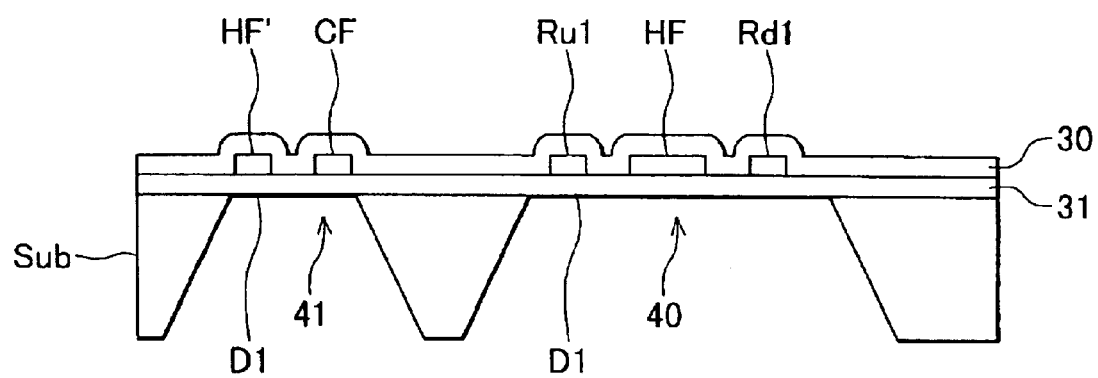
FIG. 14 is a sectional view taken along the line A—A in FIG. 13.

FIG. 13 is a plan view showing an arrangement of the heating resistor HF, the reference-purpose heat sensitive resistor CF, the heating means HF', the upstream temperature measuring resistors Ru1, Ru2, and the downstream temperature measuring resistors Rd1, Rd2 according to the fourth embodiment of the present invention, and FIG. 14 is a sectional view taken along the line A—A in FIG. 13.

As shown in FIG. 13, the heating resistor HF, the reference-purpose heat sensitive resistor CF, the heating means HF', the upstream temperature measuring resistors Ru1, Ru2, and the downstream temperature measuring resistors Rd1, Rd2 are formed on the same substrate Sub. Portions of the substrate Sub are formed as diaphragms D1, D2 each having a small thickness so that heat dissipation through thermal conduction is suppressed and heat transfer sensitivity with respect to the fluid Q is increased.

The heating resistor HF, the upstream temperature measuring resistors Ru1, Ru2, and the downstream temperature measuring resistors Rd1, Rd2 are formed on the diaphragm D1 such that the upstream temperature measuring resistors Ru1, Ru2 and the downstream temperature measuring resistors Rd1, Rd2 receive thermal influences from the heating resistor HF.

Also, the reference-purpose heat sensitive resistor CF and the heating means HF' are formed on the diaphragm D2 such that the reference-purpose heat sensitive resistor CF receives thermal influences from the heating means HF'.

With the construction described above, a thermal type flow measuring device can be realized which can suppress a characteristic variation resulting from time-dependent changes of the heating resistor HF, can achieve reduction of both power consumption and output noise, can suppress a characteristic variation caused by contamination or damage, and can perform flow measurement with high accuracy.

Though not shown, the thermal type flow measuring device of the present invention is applicable to an internal combustion engine control in an automobile. In that case, because a characteristic variation resulting from time-dependent changes of the heating resistor HF is suppressed and power consumption is reduced, a control device for an internal combustion engine can be realized which can ensure good fuel economy, clean exhaust gas, and small battery consumption.

Likewise, in the case of employing the thermal type flow measuring device of the present invention in a control device for a fuel cell, i.e., employing it in measuring the flow rate of gas for a fuel cell, because a characteristic variation resulting from time-dependent changes of the heating resistor HF is suppressed and power consumption is reduced, a control device for a fuel cell can be realized which can accurately measure the flow rate of hydrogen gas, etc. as fuel and can provide excellent power generation efficiency without causing a variation.

Particularly, when measuring hydrogen gas, a larger amount of power is required to drive the heating resistor HF than when measuring air. Hence, the present invention is suitable for applications to, by way of example, control devices for fuel cells.

While the above-described embodiments are constructed as detecting the flow rate and the flow direction of the fluid based on the output of the operational amplifier OP2, the flow rate and the flow direction of the fluid may be detected based on the output of the operational amplifier OP1.

As an alternative, the flow rate and the flow direction of the fluid may be detected based on both the outputs of the operational amplifiers OP1 and OP2.

Industrial Applicability

According to the present invention, it is possible to realize a thermal type flow measuring device which can reduce flow rate errors caused by resistance changes of the heating resistor, can suppress a characteristic variation resulting from time-dependent changes of the heating resistor HF, can reduce power consumption and output noise, can provide a quick response, can suppress a characteristic variation caused by contamination or damage, can be manufactured in a smaller size at a lower cost, and can diminish temperature influences from the wall of the fluid passage.

Also, by employing the thermal type flow measuring device of the present invention in a control device for an internal combustion engine of an automobile or a control device for a fuel cell, a control system having good fuel economy or excellent power generation efficiency can be realized.

What is claimed is:

1. A thermal type flow measuring device including a heating resistor (HF) disposed in a fluid (Q), upstream temperature measuring resistors (Ru1, Ru2) disposed upstream of said heating resistor (HF) with respect to said fluid (Q), and downstream temperature measuring resistors (Rd1, Rd2) disposed downstream of said heating resistor (HF) with respect to said fluid, thereby measuring the flow rate of said fluid, said thermal type flow measuring device comprising:

a first bridge circuit including said upstream temperature measuring resistors (Ru1, Ru2) and said downstream temperature measuring resistors (Rd1, Rd2);

a second bridge circuit including said first bridge circuit and said heating resistor (HF); and feedback control means (OP1, Tr) for heating said heating resistor (HF) in accordance with an output for keeping a balance of said second bridge circuit, wherein said upstream temperature measuring resistors or said downstream temperature measuring resistors are heated by said heating resistor, and the flow rate of said fluid is measured based on an output for keeping a balance of said first bridge circuit.

2. A thermal type flow measuring device according to claim 1, wherein the flow direction of said fluid is detected based on the output of said first bridge circuit.

3. A thermal type flow measuring device according to claim 1, wherein the flow direction of said fluid is detected based on the output of said second bridge circuit.

4. A thermal type flow measuring device according to claim 1, wherein the flow direction of said fluid is detected based on the outputs of said first bridge circuit and said second bridge circuit.

5. A thermal type flow measuring device including a heating resistor (HF) disposed in a fluid (Q), an upstream temperature measuring resistor (Ru) disposed upstream of said heating resistor (HF) with respect to said fluid (Q), and a downstream temperature measuring resistor (Rd) disposed downstream of said heating resistor (HF) with respect to said fluid, thereby measuring the flow rate of said fluid, said thermal type flow measuring device comprising:

a first bridge circuit including a heat sensitive resistance element (CF), said upstream temperature measuring resistor (Ru) and said downstream temperature measuring resistor (Rd);

a second bridge circuit including said first bridge circuit and said heating resistor (HF); and feedback control means (OP1, Tr) for heating said heating resistor (HF) in accordance with an output for keeping a balance of said second bridge circuit, wherein the distance between said heat sensitive resistance element (CF) and said heating resistor (HF) is larger than the distance between said upstream temperature measuring resistor (Ru) or said downstream temperature sensitive resistor (Rd) and said heating resistor (HF) so that said heat sensitive resistance element (CF) is positioned to receive less thermal influences from said heating resistor (HF) than said upstream temperature measuring resistor (Ru) and said downstream temperature sensitive resistor (Rd), and said upstream temperature measuring resistor or said downstream temperature measuring resistor is heated by said heating resistor, and the flow rate of said fluid is measured based on an output for keeping a balance of said first bridge circuit.

6. A thermal type flow measuring device according to claim 5, wherein the flow direction of said fluid is detected based on the outputs of said first bridge circuit and said second bridge circuit.

7. A thermal type flow measuring device according to claim 5, wherein the flow direction of said fluid is detected based on the output of said second bridge circuit.

8. A thermal type flow measuring device according to claim 5, wherein the flow direction of said fluid is detected based on the output of said first bridge circuit.

9. A thermal type flow measuring device including a heating resistor (HF) disposed in a fluid (Q), upstream temperature measuring resistors (Ru1, Ru2) disposed upstream of said heating resistor (HF) with respect to said fluid (Q), and downstream temperature measuring resistors (Rd1, Rd2) disposed downstream of said heating resistor (HF) with respect to said fluid, thereby measuring the flow rate of said fluid, said thermal type flow measuring device comprising:
   a first bridge circuit including said upstream temperature measuring resistors (Ru1, Ru2) and said downstream temperature measuring resistors (Rd1, Rd2);
   a second bridge circuit including a heat sensitive resistance element (CF) and said heating resistor (HF); and
   feedback control means (OP1, Tr) for heating said heating resistor (HF) in accordance with an output for keeping a balance of said second bridge circuit,
   wherein said heat sensitive resistance element (CF) is heated by said heating resistor, and the flow rate of said fluid is measured based on an output for keeping a balance of said first bridge circuit.

10. A thermal type flow measuring device according to claim 9, wherein the flow direction of said fluid is detected based on the outputs of said first bridge circuit and said second bridge circuit.

11. A thermal type flow measuring device according to claim 9, wherein the flow direction of said fluid is detected based on the output of said second bridge circuit.

12. A thermal type flow measuring device according to claim 9, wherein the flow direction of said fluid is detected based on the output of said first bridge circuit.

13. A thermal type flow measuring device including a heating resistor (HF) disposed in a fluid (Q), upstream temperature measuring resistors (Ru1, Ru2) disposed upstream of said heating resistor (HF) with respect to said fluid (Q), and downstream temperature measuring resistors (Rd1, Rd2) disposed downstream of said heating resistor (HF) with respect to said fluid, thereby measuring the flow rate of said fluid, said thermal type flow measuring device comprising:
   a first bridge circuit including said upstream temperature measuring resistors (Ru1, Ru2) and said downstream temperature measuring resistors (Rd1, Rd2);
   a second bridge circuit including a heat sensitive resistance element (CF) and said heating resistor (HF);
   feedback control means (OP1, Tr) for heating said heating resistor (HF) in accordance with an output for keeping a balance of said second bridge circuit;
   a heating resistor (HF') for heating said heat sensitive resistance element (CF); and
   heating control means (R3) for heating said heating resistor (HF') in accordance with an output of said feedback control means (OP1, Tr),
   wherein the flow rate of said fluid is measured based on an output for keeping a balance of said first bridge circuit.

14. A thermal type flow measuring device according to claim 13, wherein the flow direction of said fluid is detected based on the outputs of said first bridge circuit and said second bridge circuit.

15. A thermal type flow measuring device according to claim 13, wherein the flow direction of said fluid is detected based on the output of said first bridge circuit.

16. A thermal type flow measuring device according to claim 13, wherein the flow direction of said fluid is detected based on the output of said second bridge circuit.

17. A control device for an internal combustion engine, which includes flow measuring means for measuring the flow rate of gas supplied to said internal combustion engine, said flow measuring means comprising:
   a heating resistor (HF) disposed in a fluid (Q);
   upstream temperature measuring resistors (Ru1, Ru2) disposed upstream of said heating resistor (HF) with respect to said fluid (Q);
   downstream temperature measuring resistors (Rd1, Rd2) disposed downstream of said heating resistor (HF) with respect to said fluid;
   a first bridge circuit including said upstream temperature measuring resistors (Ru1, Ru2) and said downstream temperature measuring resistors (Rd1, Rd2);
   a second bridge circuit including said first bridge circuit and said heating resistor (HF); and
   feedback control means (OP1, Tr) for heating said heating resistor (HF) in accordance with an output for keeping a balance of said second bridge circuit,
   wherein said upstream temperature measuring resistors or said downstream temperature measuring resistors are heated by said heating resistor, and the flow rate of said fluid is measured based on an output for keeping a balance of said first bridge circuit.

18. A control device for a fuel cell, which including flow measuring means for measuring the flow rate of gas used in said fuel cell, said flow measuring means comprising:
   a heating resistor (HF) disposed in a fluid (Q);
   upstream temperature measuring resistors (Ru1, Ru2) disposed upstream of said heating resistor (HF) with respect to said fluid (Q);
   downstream temperature measuring resistors (Rd1, Rd2) disposed downstream of said heating resistor (HF) with respect to said fluid;
   a first bridge circuit including said upstream temperature measuring resistors (Ru1, Ru2) and said downstream temperature measuring resistors (Rd1, Rd2);
   a second bridge circuit including said first bridge circuit and said heating resistor (HF); and
   feedback control means (OP1, Tr) for heating said heating resistor (HF) in accordance with an output for keeping a balance of said second bridge circuit,
   wherein said upstream temperature measuring resistors or said downstream temperature measuring resistors are heated by said heating resistor, and the flow rate of said fluid is measured based on an output for keeping a balance of said first bridge circuit.

* * * * *